Figure 1:
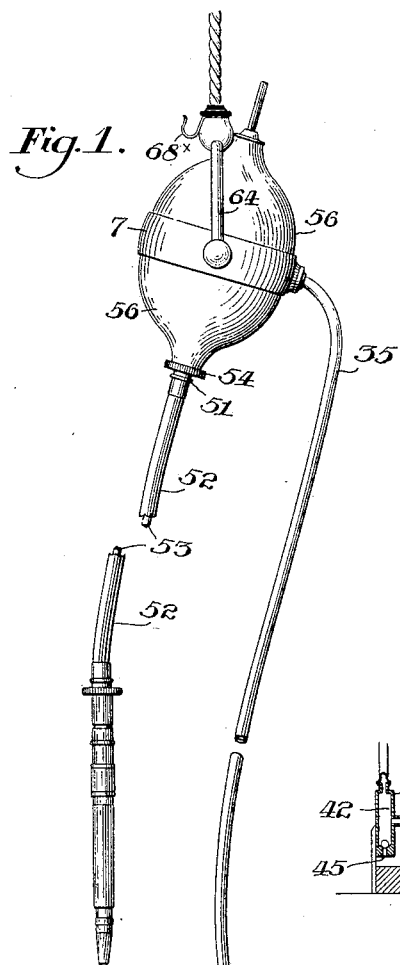

(No Model.) 7 Sheets—Sheet 1.

F. E. WHIPPLE & C. A. STAUFFER.
ELECTRIC MOTOR.

No. 595,898. Patented Dec. 21, 1897.

Witnesses.
A. V. Groups
A. V. Blackwood

Inventors
Fenner E. Whipple,
Charles A. Stauffer,
per John R. Nolan
Attorney.

(No Model.) 7 Sheets—Sheet 2.
F. E. WHIPPLE & C. A. STAUFFER.
ELECTRIC MOTOR.
No. 595,898. Patented Dec. 21, 1897.
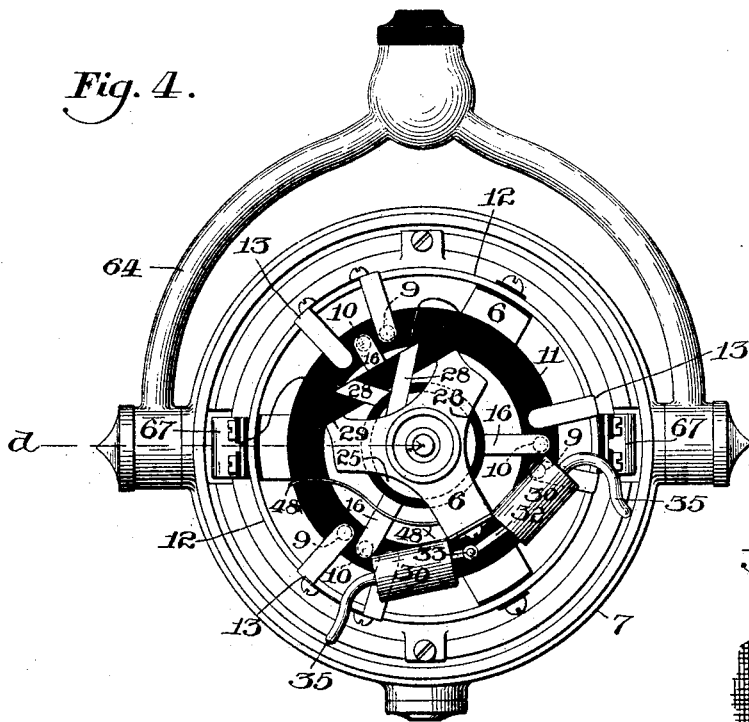
Fig. 4.
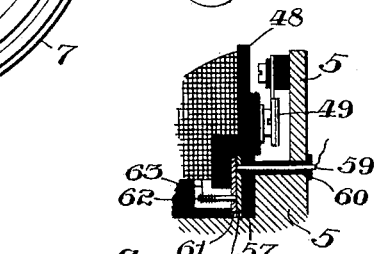
Fig. 6.
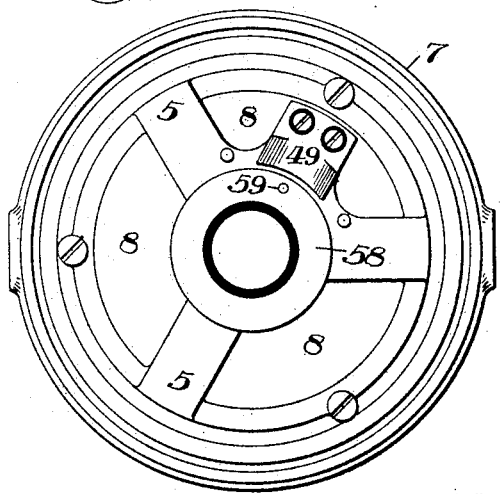
Fig. 5.
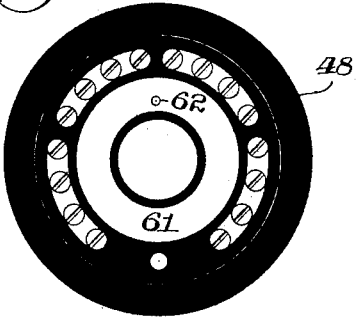
Fig. 5a.
Fig. 7.
Witnesses.
A. V. Groups
A. V. Blackwood
Inventors
Fenner E. Whipple,
Charles A. Stauffer,
per John R. Nolan
Attorney.

(No Model.) 7 Sheets—Sheet 3.

F. E. WHIPPLE & C. A. STAUFFER.
ELECTRIC MOTOR.

No. 595,898. Patented Dec. 21, 1897.

Witnesses.
A. V. Groups
A. V. Blackwood.

Inventors
Fenner E. Whipple,
Charles A. Stauffer,
per John R. Nolan
Attorney.

(No Model.) 7 Sheets—Sheet 4.

F. E. WHIPPLE & C. A. STAUFFER.
ELECTRIC MOTOR.

No. 595,898. Patented Dec. 21, 1897.

Witnesses.
A. V. Groups
A. V. Blackwood

Inventors
Fenner E. Whipple,
Charles A. Stauffer,
per John R. Nolan
Attorney.

(No Model.) 7 Sheets—Sheet 5.

F. E. WHIPPLE & C. A. STAUFFER.
ELECTRIC MOTOR.

No. 595,898. Patented Dec. 21, 1897.

Witnesses.
A. V. Groups
H. V. Blackwood.

Inventors
Fenner E. Whipple
Charles A. Stauffer
per John R. Nolan
Attorney.

(No Model.) 7 Sheets—Sheet 6.
F. E. WHIPPLE & C. A. STAUFFER.
ELECTRIC MOTOR.
No. 595,898. Patented Dec. 21, 1897.
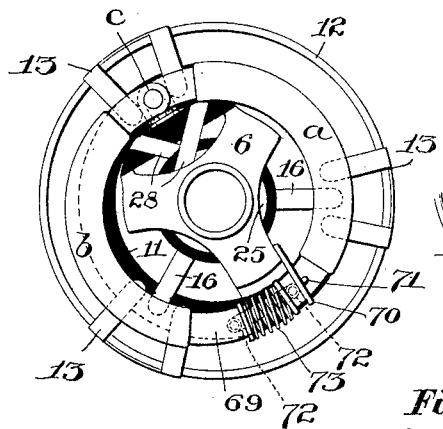
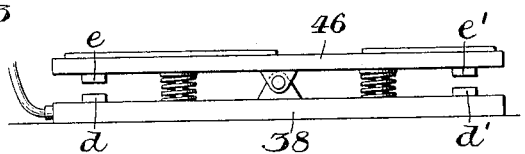
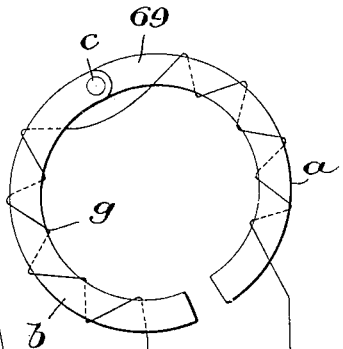
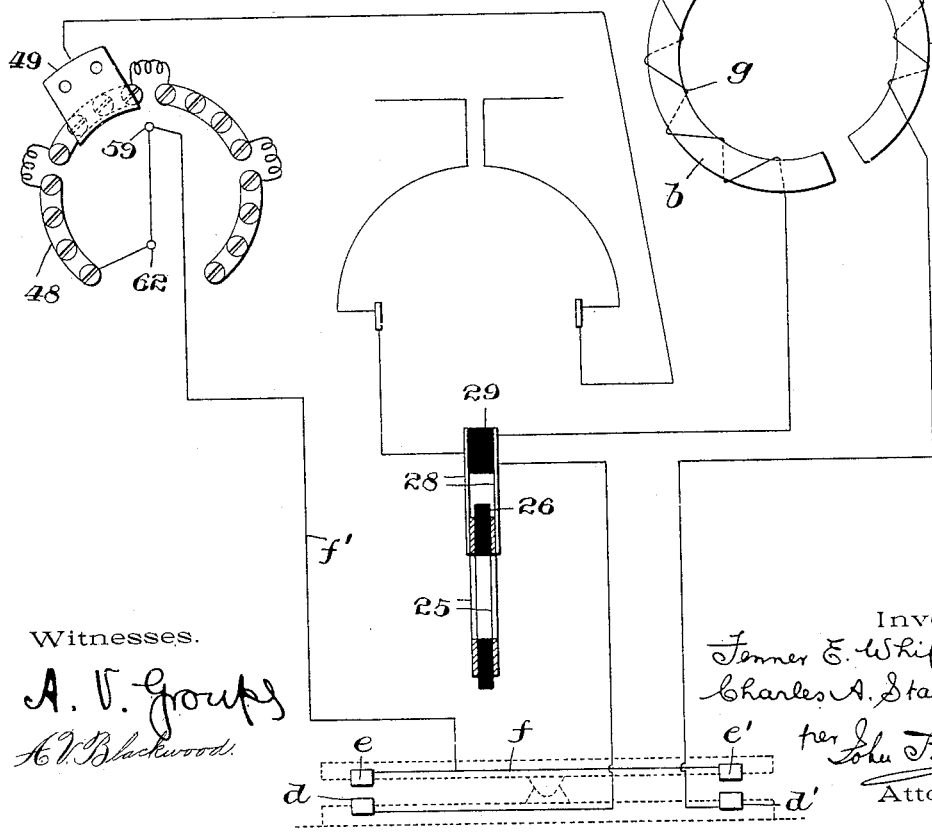
Witnesses.
A. V. Group
A. V. Blackwood.
Inventors
Fenner E. Whipple
Charles A. Stauffer,
per John R. Nolan
Attorney.

(No Model.) 7 Sheets—Sheet 7.
F. E. WHIPPLE & C. A. STAUFFER.
ELECTRIC MOTOR.
No. 595,898. Patented Dec. 21, 1897.
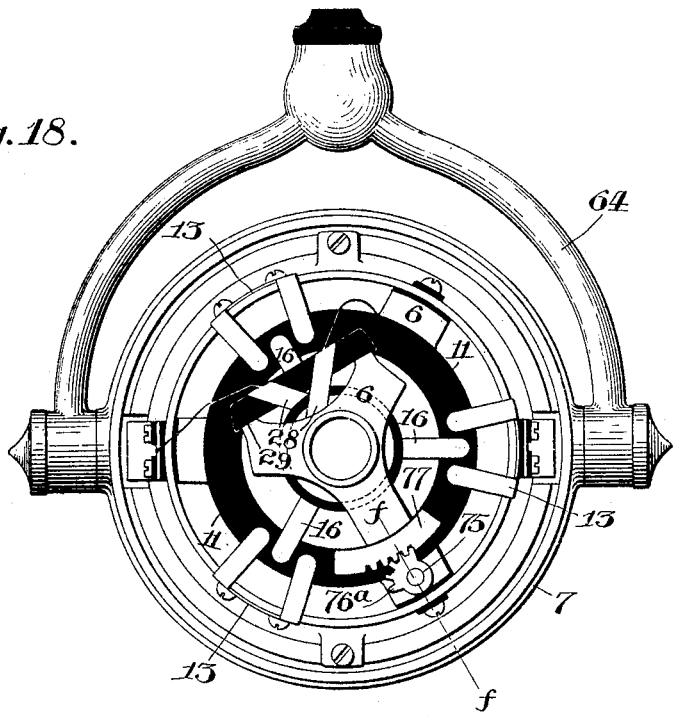
Fig. 18.
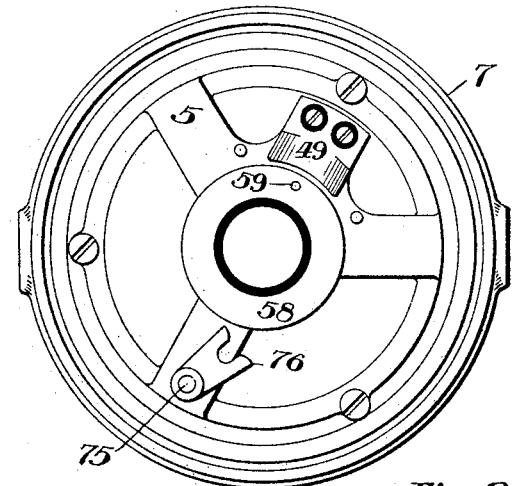
Fig. 19.
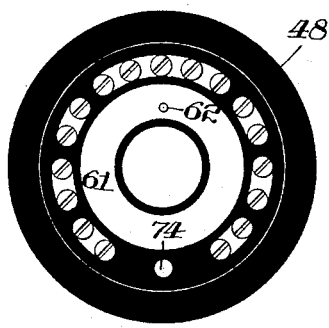
Fig. 19.ª
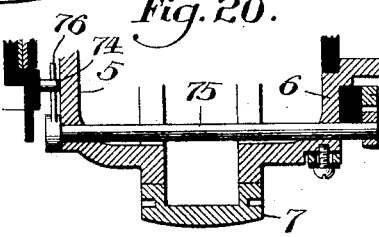
Fig. 20.
Witnesses.
A. V. Groups
A. V. Blackwood
Inventors
Fenner E. Whipple,
Charles A. Stauffer,
per John F. Nolan
Attorney.

UNITED STATES PATENT OFFICE.

FENNER E. WHIPPLE AND CHARLES A. STAUFFER, OF PHILADELPHIA, PENNSYLVANIA; SAID STAUFFER ASSIGNOR TO JOSEPH C. DONNELLY, OF SAME PLACE.

ELECTRIC MOTOR.

SPECIFICATION forming part of Letters Patent No. 595,898, dated December 21, 1897.

Application filed May 1, 1896. Serial No. 589,839. (No model.)

*To all whom it may concern:*

Be it known that we, FENNER E. WHIPPLE and CHARLES A. STAUFFER, citizens of the United States, residing in the city and county of Philadelphia and State of Pennsylvania, have invented certain new and useful Improvements in Electric Motors, of which the following is a full, clear, and exact description, reference being had to the accompanying drawings, forming a part of this specification.

This invention relates to electric motors, having reference more especially to the class used for dental purposes, wherein the motor is suspended or otherwise sustained in convenient position to a dental chair and is adapted to actuate a dental tool under the control of the operator, our object in this connection being to provide a simple, compact, and efficient construction possessing the following characteristics, to wit: a stationary external armature and revolving field therefor, whereby the minimum magnetic circuit is secured and a machine of maximum relative power is produced; novel mechanism whereby the starting, stopping, and reversing of the motor may be conveniently attained; novel and efficient means for regulating the speed of the motor; certain means whereby the operation of the motor may be automatically stopped, and, finally, various features of construction and organization of parts whereby advantages are gained, all of which will be hereinafter particularly described and claimed.

Figure 2:
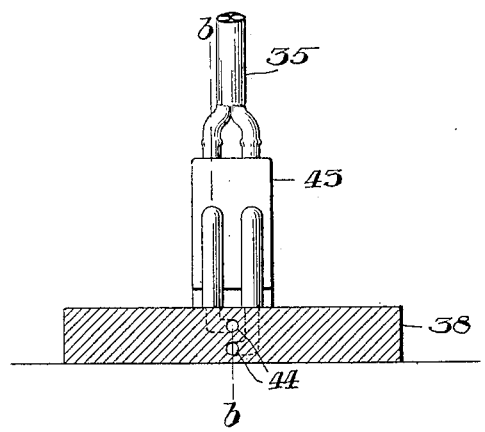
Figure 3:
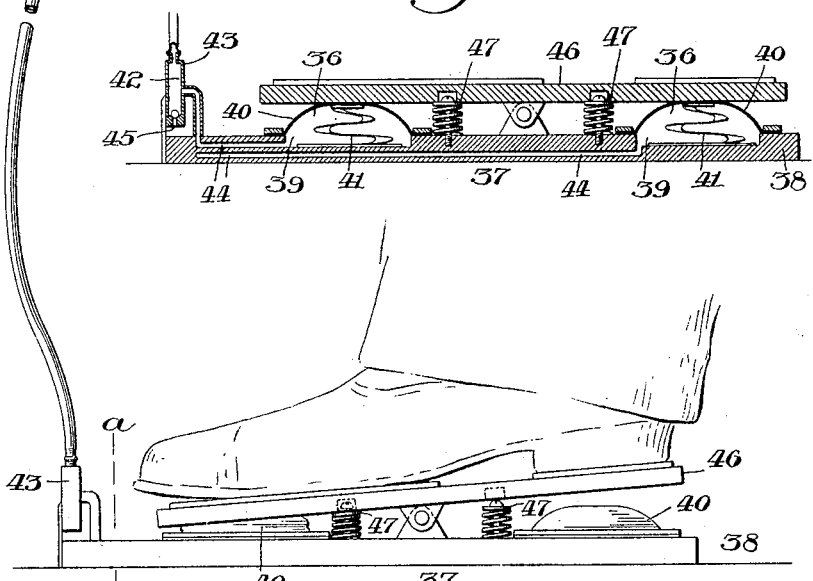
Figures 8, 9:
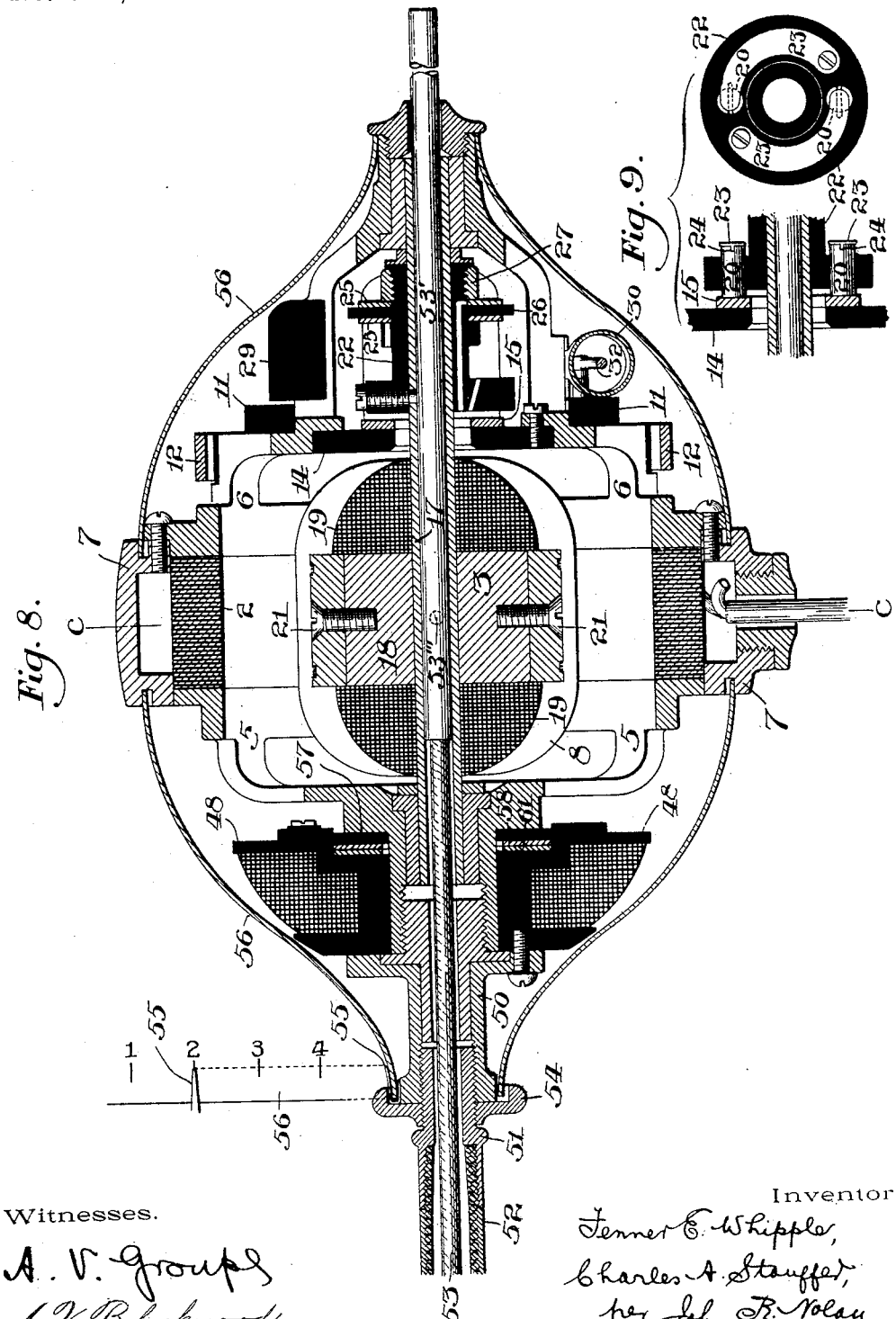
Figure 10:
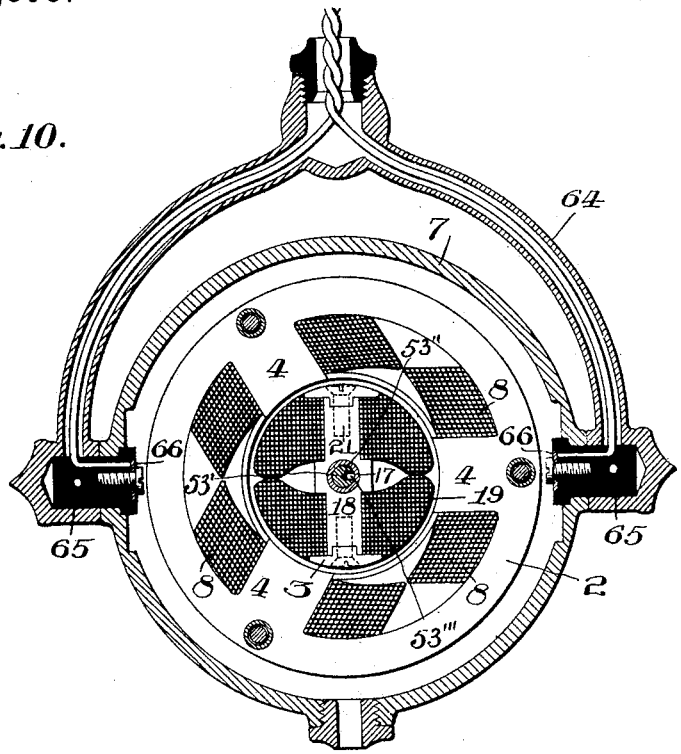
Figure 11:
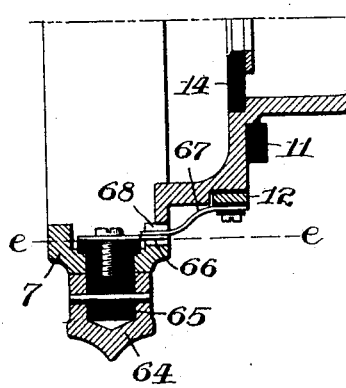
Figure 12:
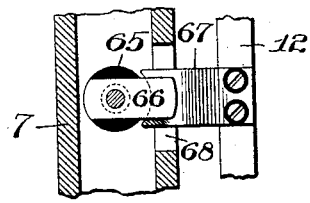
Figure 13:
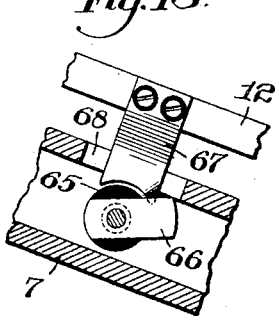
Figure 14:
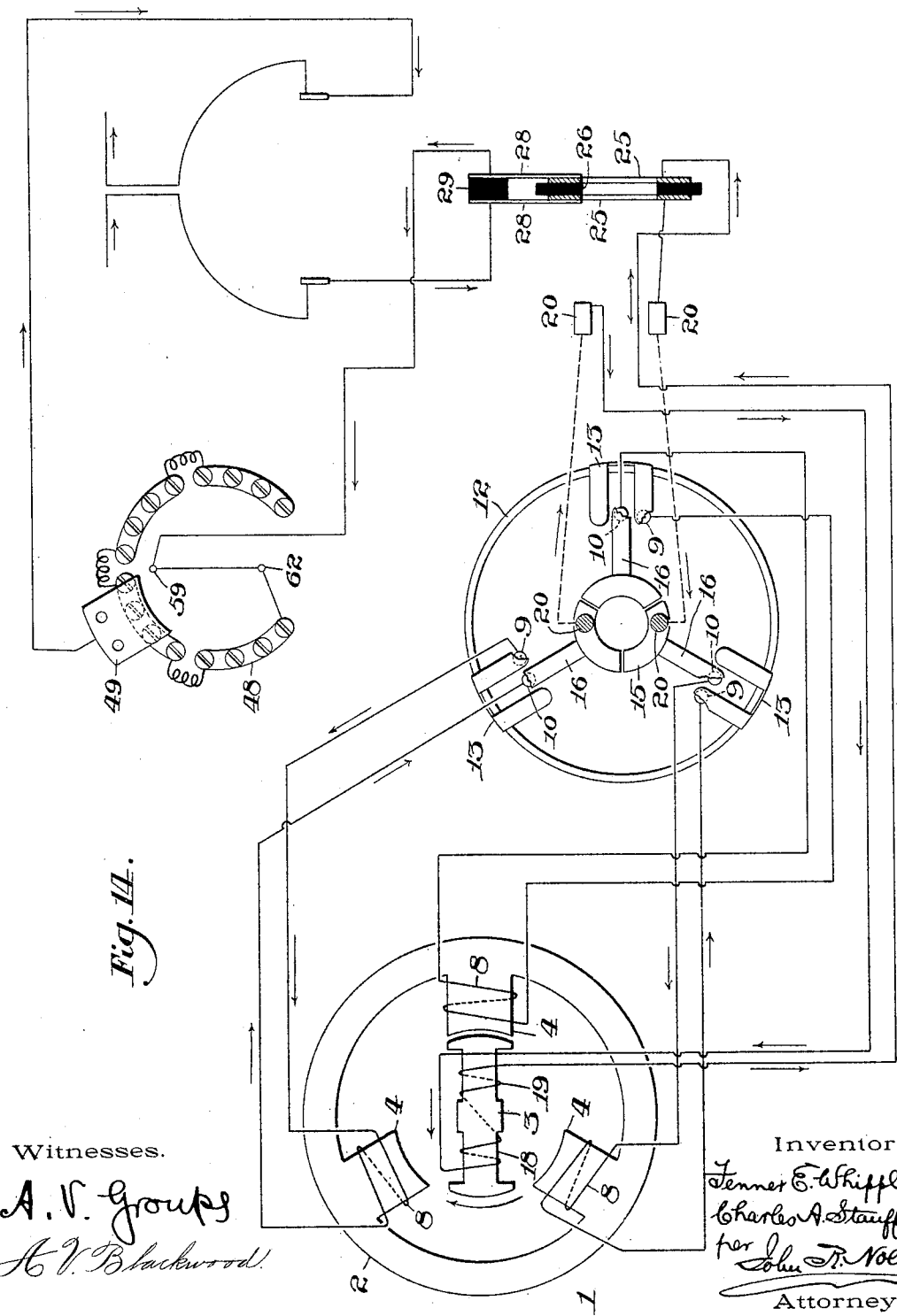

In the drawings, Figure 1 is a side elevation of the motor as in actual use. Fig. 2 is a transverse section, as on the line $a\,a$ of Fig. 1. Fig. 3 is a full vertical section of the bellows structure, as on the line $b\,b$ of Fig. 2. Fig. 4 is an elevation of the upper end of the motor with the casing removed. Fig. 5 is a similar elevation of the lower end, the rheostat being removed and shown in Fig. 5$^a$. Fig. 6 is a sectional detail of the rheostat, showing the contact devices. Fig. 7 is a similar detail of the pneumatic sack-containing cylinders for controlling the contact-ring. Fig. 8 is a longitudinal vertical section of the motor. Fig. 9 is a detail of brush devices. Fig. 10 is a full transverse section of the motor, as on the line $c\,c$ of Fig. 8. Fig. 11 is a sectional detail of the circuit making and breaking devices, as on the line $d$ of Fig. 4. Fig. 12 is a section as on the line $e\,e$ of Fig. 11, the circuit being completed. Fig. 13 is a similar view, the circuit being broken. Fig. 14 is a diagram illustrating the electrical connections of the motor. Fig. 15 is an end view of a modified construction of reversing mechanism. Fig. 16 is an elevation of contact-treadle for use in the latter. Fig. 17 is a diagram of the electric connections of the modification. Fig. 18 is an end view of the motor as equipped with another modification of reversing means. Fig. 19 is a view of the opposite end of the motor with the rheostat removed and shown in Fig. 19$^a$. Fig. 20 is a section as on the line $f\,f$ of Fig. 18.

The numeral 1 designates the motor, of which 2 is the armature, and 3 the field. The armature comprises a laminated ring of soft iron and insulating material with three or more inwardly-projecting teeth 4, the ring being embraced by two spiders 5 6, to which it is affixed by means of screws or other means, and the whole being secured to an exterior supporting-ring 7. Around and at right angles to the teeth 4 are wound the armature-coils 8, the ends of each coil being connected to adjacent studs 9 10, respectively, on a ring 11, of insulating material, which is rotatably mounted on the spider 6, concentric with the armature-ring.

Fixed to the spider and insulated therefrom is a metallic annulus 12, which encircles the ring 11. This annulus is provided with spring-clips 13, the ends of which extend inwardly, so as to bear normally on the ring and lie directly in the path of the respective studs. As there are three pairs of such studs there are of course provided three pairs of relatively-arranged clips, whose function will hereinafter appear. To an insulating-ring 14 on the spider 6, so as to be concentric with the armature, is secured a commutator 15, which in this case is made up of three sections, having spring-clips 16, which extend between the ends of the respective pairs of clips 13 on the annulus 12. The extremities of the clips 16 likewise bear on the ring 11 in the path of the studs 9 10.

Mounted on a hollow shaft 17 centrally of the armature is the field-magnet 3, of which 18 is the core and 19 the coils, the ends of which latter are electrically connected with one of the brushes 20 and the main line, respectively.

We preferably make the core H-shaped, the end heads being held in place by screws 21 or other means, so as to be removable. Hence we are enabled to wind the coils mechanically on forms, place them on the core, and then apply the end heads in a manner to fasten the coils in place. This construction obviates the otherwise necessity of winding the coils on the core by hand.

Fixed to the shaft 17, adjacent to the commutator, is a flanged sleeve 22, of insulating material, to perforations in the flange of which are fitted the brushes 20, so as to act against the commutator. The brushes are held yieldingly in action by means of flat springs 23, which are secured to the flange of the sleeve 22, such springs being provided at their free or acting ends with strips or projections 24, that enter kerfs in the outer ends of the brushes, respectively, and thus prevent the independent turning of the latter during the rotation of their holder. These coacting strips and kerfs also provide greater superficial contact than could otherwise be had.

On the sleeve 22 are arranged two metal rings 25 25, which are separated by an interposed insulating-annulus 26, the whole being clamped in place by means of a nut 27, screwed on the end of the sleeve. To one of the rings one end of the field-coil is electrically connected, the other ring being connected with a brush 20. Bearing against the faces of the rings, respectively, are two brushes 28 28, which are secured to a block 29, of insulating material, affixed to the spider 6. To these brushes the feed-wires are connected, to the end that when the circuit is completed (as below explained) the current will flow through the electrical connections above described to and through the stationary armature and the rotatable field, the described construction and relative arrangement of such armature and field effecting the shortest possible magnetic circuit and insuring a machine of great power in comparison with the weight and size. It will be seen that by the employment of three or more teeth in the armature-ring we are enabled to start the motor instantly at any point.

By reference to Fig. 14 it will be seen that each coil of the stationary armature is made alternately of north and south polarity, thereby causing a combined attraction and repulsion of the revolving field, which is an electromagnet connected in series with all the active coils of the armature and of constant polarity. Thus where three armature-coils are employed, as in the illustration, two of said coils are always active and in connection with the field, while the third coil is inactive. It will also be seen that by partially turning the ring 11 to the right or left the studs 9 10 thereon will be moved in relation to the several clips so as to break the circuit and thereby check the operation of the motor, or to effect contact with the commutator-clips and either member of the respective ring-clips in a manner to vary the direction of the flow of the current and thereby, perforce, the direction of rotation of the motor, as desired. By this construction the ring performs the function of a common terminal for the respective coils of the armature, and we are enabled to break the current or short-circuit the coils in six different places simultaneously and so divide up the arc or spark as to insure the reversing of the motor at full speed and under full load with the minimum sparking at the contact-points.

As a simple and efficient means whereby the several positions of the contact-ring 11 may be readily controlled by the operator we have devised the following construction, reference being had to Figs. 1, 2, 3, 4, and 7 of the drawings: Fixed to the spider 6, adjacent to the ring 11, are two small cylinders 30, in which are fitted pistons 31, respectively, the outer ends of the rods 32 of which are pivotally connected, as at 33, to said ring, so that by moving the pistons to and fro in alternate succession the ring 11 will be reciprocated. In each of the cylinders, intermediate its head and the piston, is contained a small expansible sack 34, from the interior of which extends a flexible tube 35. There are thus two tubes, and these lead to pneumatic cells 36 36, respectively, in a bellows structure 37, resting upon the floor. This structure comprises a base 38, in the upper surface of which are formed two depressions 39, covered by flexible caps 40, that are normally expanded by the action thereon of suitably-arranged springs 41. Leading from the depressions to separate chambers 42 in a valve-box 43 at one end of the base are two ducts 44, the tubes being connected to the respective chambers. Hence if either of the caps be depressed the air in the underlying cell will be forced through the communicating tube and directed thereby to the sack, which, expanding, will advance the opposed piston and thereby partially turn the ring in the desired direction. In the lower portion of each of the chambers in the box 43 is a normally-closed valve-port 45, which is automatically opened to permit the ingress of air to the chamber as required. Fulcrumed upon the base, intermediate the cells, is a rocking treadle-lever 46, which is maintained normally in horizontal position by means of spring-actuated heads 47, upon which it rests, so that the operator by placing his foot upon the lever and rocking it, as desired, may compress either of the caps, as occasion may require.

When the lever is in the normal position, the motor is idle, the ring 11 in such case being held with its studs out of contact by the action of a spring 48×, one end of which is secured to the spider 6, while the other or free end extends between a couple of pins on the ring.

The spider 5 is provided with a boss or hub upon which is rotatably mounted a rheostat 48, with one of the segments of which one of the feed-wires is connected, the contact-plate 49, which coacts with the segments, being affixed to and insulated from the spider, to the end that if the rheostat be turned to the right or left the desired segment will be engaged with the contact-plate to afford the requisite resistance to regulate the speed of the motor.

Fixed to the rheostat is a flanged sleeve 50, to which is screwed or otherwise secured a coupling 51 on the sheath 52 of the flexible shaft 53, which shaft extends into the hollow shaft 17, above described, and is secured thereto. Hence by turning the sheath by hand the rheostat will be set as desired. On the coupling is a milled lock-nut 54, which is adapted to be screwed hard against the sleeve to secure the coupling thereto. On this nut is a pointer 55, which extends in close relation to a series of appropriate graduations on a shell or casing 56, that incloses the motor and its immediate connections, which pointer and graduations indicate the different speeds of the motor.

The flexible shaft is connected with the hollow shaft 17 so as to have longitudinal play therein, to the end that the longitudinal movement thereof in its operation will not draw upon or "kink" the outer flexible sheath. Accordingly the inner end of the flexible shaft is secured to a rod 53', which is provided with a longitudinal groove or way 53", and the interior of the hollow shaft is provided with an inwardly-extending stud 53''', which registers with the groove or way when the rod is inserted in the hollow shaft. (See Figs. 8 and 10.) By this construction it will be obvious that while the rod will be positively rotated by and with the hollow shaft independent movement of the rod will be permitted under the circumstances stated. It will also be obvious that the flexible shaft with its rod may be readily withdrawn from or applied to the hollow shaft, as occasion may require.

In order to insure a good electrical contact between the rotatable rheostat and its connections, we provide the following construction: Imposed against a shoulder on the boss or hub of spider 5 is an insulating-ring 57, to the face of which is affixed a metallic ring 58, a pin 59 extending from the latter through an insulating-bushing 60 in said shoulder and having the conducting-wire connected thereto. Bearing against the ring 58 is a similar ring 61, which is affixed to the rheostat and which latter ring has attached thereto a pin 62, around which is wound a wire 63, that is electrically connected with the coils of the rheostat. (See Fig. 6.)

The motor is embraced by a yoke 64, through the hollow limbs of which the feed-wires extend, which wires may, if desired, afford suspensory means for the motor, as herein illustrated. The limbs of the yoke are preferably pivotally connected with the supporting-ring 7, above described, and the connections between the wires therein and those in the interior of the casing are such that when the motor is in its normal or idle position the circuit is broken, but when the motor is swung in its bearings by the act of raising the operating-tool or the flexible shaft the circuit is completed and the motor in consequence set in operation. The advantage of this construction is that when the tool is dropped by the operator the current is automatically cut off, thereby insuring economy in the use of the current. This is particularly desirable where a battery-current is used.

In the present case the free ends of the hollow yoke-limbs have fixed thereto inwardly-projecting studs 65, of insulating material, which are fitted to diametrically opposite orifices in the supporting-ring 7, so as to afford horizontal axes for the motor. On the inner ends of these studs are fixed contact-plates 66, while to the respective sides of the terminal ring 12 are secured plates 67, that extend through slots 68 in the supporting-ring 7 in close relation to the plates 66, the construction and arrangement being such that when the motor is in its normal position above mentioned the respective plates 66 67 (or one of them) are out of contact, but when the motor is swung on its axes said plates are brought into electrical contact, so as to complete the circuit.

We preferably, though not essentially, provide the yoke with a hook 68×, upon which the flexible shaft may be placed, so as to maintain the motor in horizontal position—as, for example, when a brush or wheel is used on the rearwardly-projecting spindle portion of the central shaft.

In Figs. 15 to 17, inclusive, is shown a modification of the mechanism above described for controlling the operation of the motor. In this modified form an electromagnet 69 is employed, the same comprising two semicircular segments $a\ b$, which are pivotally connected, as at $c$, to the block 29, above described as affixed to the spider 6. The free end of one of the segments $a$ extends through a slotted plate 70, affixed to the spider, and is held therein by means of a pin 71, while the opposing end of the other segment $b$ is connected with the contact-ring 11 by means of a link 72. Interposed between the opposing ends or poles of the magnet is a spring 73, the tendency of which is to force the segment $b$ outward, and thus maintain the ring 11 in a normal position. Upon the floor is arranged a contact making and breaking device, the same in this instance comprising a base 38, with a centrally-fulcrumed lever 46 thereon. On the base, near its ends, are contact-pieces $d\ d'$, respectively, with which opposite contact-studs $e\ e'$ on the respective arms of the lever are adapted to coact, as below explained. The studs $e$ $e'$ are electrically connected by a wire $f$, and thence connected with the rheostat by a conductor $f'$. One of the contact-studs $d$ in the base is connected with one of the brushes 28, such brush being connected with one end of the magnet-coil $g$, and the other end of the latter being connected with the contact-stud $d'$ on the base.

The relative arrangement of the parts is such that the ring 11 normally makes a contact requisite to effect the direct rotation of the motor, the lever 46 in that case occupying a horizontal position, so as to break the contact between the studs on each arm thereof and those of the base. When, however, the operator depresses the forward arm of the lever, contact between the opposing forward studs is made, whereupon the current passes to and actuates the motor. If it be desired to reverse the motor, the operator depresses the rearward arm of the lever, thereby making contact between the studs $d'$ $e'$. The magnet thus being energized shifts the ring to change the positions of the contacts thereon in a manner to effect the reversal of the direction of rotation of the motor.

In Figs. 18 to 20, inclusive, of the drawings, is shown another modification of the mechanism for controlling the relative positions of the ring 11 in respect to the outer contact or terminal ring, in which modification the treadle devices are dispensed with and the ring 11 is operated by hand—that is to say, the segments of the rheostat are distributed so as to secure equal resistances on each side and the rheostat is provided midway of the lower segments with a stud 74. Extending through the spiders longitudinally of the machine is a rock-shaft 75, on one end of which is a fork 76, that extends into the path of the stud 74, while on the other end is a pinion $76^a$, that gears with a toothed segment 77, affixed to the ring 11. Hence if the sheath be turned sufficiently the stud on the rheostat will engage the fork and turn it slightly, so as to rock the shaft and the pinion, and thereby accordingly shift the ring to effect the reversal of the direction of movement of the motor, the speed thereof being regulated by the appropriate resistances. If subsequently the sheath be turned in a reverse direction, the stud will engage the fork and move the parts to their original position.

We remark that we believe to be broadly new in an electrical motor the connection of one end of each coil of an external stationary armature to a common terminal, and therefore we would have it understood that we do not limit ourselves to the particular construction shown, nor to the use of such a motor for dental purposes solely. Further, it is obvious that the various features of construction and organization of the motor generally may be considerably modified without departing from the fair spirit of the invention.

We claim as our invention—

1. In an electric motor, a stationary external armature having three or more electrically-disconnected coils, a common terminal, means for establishing an electrical connection between one end of each of said coils and the said common terminal, and a central revolving field, substantially as specified.

2. In an electrical motor, a stationary external armature having three or more electrically-disconnected coils, a common terminal and a switch whereby either end of each coil may be electrically connected to or disconnected from the said terminal, together with a central revolving field, substantially as specified.

3. In an electrical motor, a stationary external armature having three or more electrically-disconnected coils, a common terminal, means whereby one end of each coil may be connected to or disconnected from said terminal, a commutator, and means for completing electrical connections between said commutator and the opposite ends of the said coils, substantially as specified.

4. In an electrical motor, a stationary armature having three or more independent coils, insulated contacts to which said coils are connected at one end, other insulated contacts to which they are connected at the opposite ends, a common terminal ring, a switch whereby said ring may be brought into electrical connection with one series of said contacts, a commutator, means for electrically connecting said commutator with the other series of said contacts, a central revolving field, and means for supplying current thereto, substantially as specified.

5. In an electrical motor, a stationary armature having three or more similarly-wound independent coils, two sets of insulated contacts to which both ends of all the coils are respectively connected, a common terminal ring, a movable support for the contacts, whereby all those of either set may be brought into engagement with said ring, means for operating said support, a commutator having means for engagement with all the contacts of either set, a central revolving field, and means for supplying a current of constant polarity to the coils of said field, substantially as specified.

6. In an electrical motor, a stationary external armature consisting of a ring with inwardly-projecting teeth wound with armature-coils, a common terminal ring provided with clips, contacts arranged adjacent to said clips, a support for said contacts, a commutator, clips thereon arranged in close relation to the studs, a field-magnet, electrical connections between the same and the commutator, and means for shifting the contact-support in relation to the clips, substantially as described.

7. In an electric motor, the combination of the armature, the field-magnet, the commutator and their complementary electrical connections, of pneumatic devices for changing the relation of the contacts between the commutator and the armature-coils so as to reverse the direction of flow of the current through said coils, substantially as described.

8. In an electric motor, the combination, with a contact-support, of means for shifting the same, to reverse the direction of flow of the current through the coils, said means comprising a cylinder, a piston therein connected with said support, a pneumatic compression device, and a tube leading therefrom to the cylinder, substantially as described.

9. In an electric motor, the combination, with a contact-support, of means for shifting the same, comprising a cylinder, a piston therein connected with said support, an expansible sack intermediate the cylinder-head and the piston, a pneumatic compression device, and a tube leading therefrom to said sack, substantially as described.

10. In an electric motor, the combination, with a contact-support, of means for shifting the same, comprising two oppositely-disposed cylinders, pistons therein connected with said support, a pneumatic compression device, and connections between said device and the cylinders, substantially as described.

11. In an electric motor, the combination, with a contact-support, of means for shifting the same, comprising two oppositely-disposed cylinders, pistons therein connected with said support, a pneumatic compression device provided with two chambers, and independent connections between said chambers and the cylinders, substantially as described.

12. In an electric motor, the combination, with a contact-support, of means for shifting the same, comprising two oppositely-disposed cylinders, pistons therein connected with said support, a base, normally-expanded flexible caps thereon forming air-cells, a lever fulcrumed upon the base so as to extend above said caps, and independent connections between the said cells and the pistons, respectively, substantially as described.

13. In an electrical motor, the combination of the armature, the field-magnet, a partially-rotatable ring provided with contact-studs to which the armature-coils are connected, a commutator to which the field-coils are connected, clips on said commutator extending into the path of the said studs, a terminal ring provided with clips also extending into their path, means for normally holding the ring with its studs out of contact with the clips, and means for turning the ring in either direction, as desired, substantially as described.

14. In an electrical motor, the armature, the field-magnet, the commutator, and the rotatable rheostat, all concentrically mounted, as described, in combination with their complementary electrical connections, and means for rotating the rheostat, substantially as described.

15. In an electrical motor, the combination of the supporting-frame, the stationary armature, therein, the rotatable field, the central shaft therefor, the commutator, the rotatable rheostat on said support, the contact-plate therefor, the complementary electrical connections, the flexible shaft connected with the central shaft, the sheath for said flexible shaft, and operative connections between said sheath and the rheostat, substantially as described.

16. In an electric motor, the combination with the supporting-frame, of the armature, the field-magnet, the commutator, the rheostat, and the central shaft, all concentrically mounted within the frame as described, the contact-plate for said rheostat, the complementary electrical connections, the flexible shaft connected with the central shaft, the sheath for said flexible shaft, the sleeve connected with the rheostat, the coupling connecting said sleeve and the sheath, and the lock-nut on said coupling, substantially as described.

17. In an electric motor, the combination with the supporting-ring, the spiders secured thereto, the armature held by and between said spiders, the field-magnet, the central shaft to which it is secured, the commutator, the rotatable rheostat mounted on a boss on one of said spiders, a contact-ring fixed to and insulated from said spider, a contact-ring on the rheostat coacting with the former ring, a contact-plate coacting with the rheostat, the complementary coils and electrical connections, and means for turning the rheostat in relation to the said contact-plate, substantially as described.

18. The combination with a support, of an electrical motor pivotally mounted therein, and contact devices on the axes or pivots adapted to effect the making of the circuit when the motor is in one position, and the breaking thereof when the motor is in another position, substantially as described.

19. The combination, with a yoke, carrying insulating-studs, a motor having a supporting-ring pivoted on said studs, contact-plates on said studs, and contact-plates on the motor, said plates being so relatively arranged that when the motor is in its normal position the plates are out of contact, but when the motor is swung on its axes said plates are brought into electrical contact, substantially as described.

20. In an electrical motor, the combination with the armature, the field-magnet, the commutator, the central shaft, the sleeve on the latter adjacent to the commutator, the brushes in said sleeve coacting with the commutator, the springs bearing against said brushes, and provided with studs or projections which enter recesses in the ends of the brushes together with the complementary coils and electrical connections, for the parts stated, substantially as described.

21. In an electrical motor, the combination of the supporting-ring, the casing thereon, the motor within said casing, its central shaft, the flexible shaft connected therewith, its sheath, the rheostat in said casing, the fixed contact-plate therefor, the connection between said sheath and rheostat, the lock-nut, and the pointer thereon extending in proximity to graduations on the casing, substantially as described.

22. In an electric motor, the combination of a stationary external armature having a plurality of pole-pieces, their coils, a common insulated terminal for one end of each of the said coils, electrical connections with the opposite ends of the said coils whereby the pole-pieces thereof are made alternately of north and south polarity and whereby certain of the coils are rendered active and inactive with respect to the field, and a central revolving field consisting of a field-magnet of constant polarity, substantially as specified.

23. In an electric motor, the combination with a stationary external armature having a plurality of pole-pieces, their coils, and a common insulated terminal for one end of each of the said coils, of a central revolving field consisting of an electromagnet of constant polarity, and electrical connections for the said armature-coils whereby certain of them are rendered active and inactive with respect to the field and whereby each of the pole-pieces is made alternately of north and south polarity, the active coils being connected in series with the coils of the field through said common terminal, substantially as specified.

24. In an electric motor, the combination of an armature, a field-magnet, a rotatable rheostat, and the complementary electrical connections whereby the rotation of said rheostat controls the speed of the motor, substantially as specified.

25. In an electric motor, the combination with a supporting-frame and a casing, of a motor therein, its shaft, the rheostat in said casing, a contact member therefor, and means for effecting relative adjustment between said rheostat and contact member, together with the complementary electrical connections, substantially as described.

In testimony whereof we have hereunto affixed our signatures in the presence of two subscribing witnesses.

FENNER E. WHIPPLE.
CHARLES A. STAUFFER.

Witnesses:
JOHN R. NOLAN,
ANDREW V. GROUPE.